United States Patent [19]  [11] Patent Number: 4,476,190
Clarke et al. [45] Date of Patent: Oct. 9, 1984

[54] ADHESIVES FOR PREPASTED WALLCOVERINGS

[75] Inventors: John B. Clarke; John F. Firth, both of Bradford, England

[73] Assignee: Allied Colloids Limited, Bradford, England

[21] Appl. No.: 433,591

[22] Filed: Oct. 8, 1982

[30] Foreign Application Priority Data

Oct. 15, 1981 [GB] United Kingdom ................ 8131128

[51] Int. Cl.$^3$ .............................................. C09J 7/02
[52] U.S. Cl. ................................... 428/350; 525/191; 525/201; 525/221; 428/355
[58] Field of Search ................. 525/221, 201, 2.7, 2.8, 525/191; 428/355, 350

[56] References Cited

U.S. PATENT DOCUMENTS 3,758,641  9/1973  Zweigle ............................... 525/201
4,361,452 11/1982  Clarke et al. ........................ 525/201

FOREIGN PATENT DOCUMENTS 560331  7/1958  Canada ................................ 525/201

Primary Examiner—Marion McCamish
Assistant Examiner—E. Buffalow
Attorney, Agent, or Firm—Lawrence Rosen

[57] ABSTRACT

The adhesive coating of a water wettable prepasted wallcovering is formed of a blend of water insoluble but water swellable anionic polymer particles and water insoluble but water swellable cationic polymer particles. The coating may be applied from a dispersion of the particles in volatile organic liquid.

18 Claims, 2 Drawing Figures

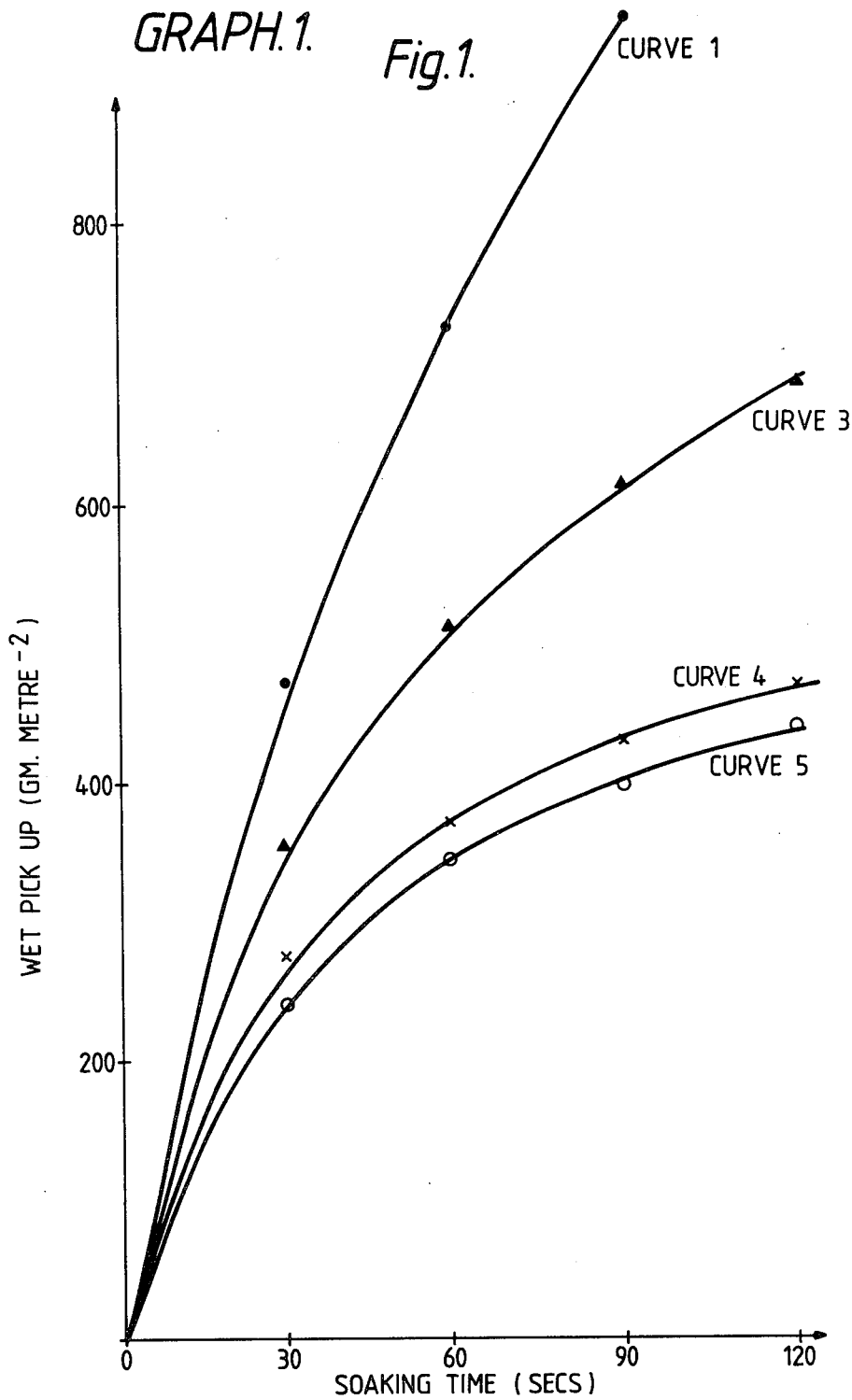

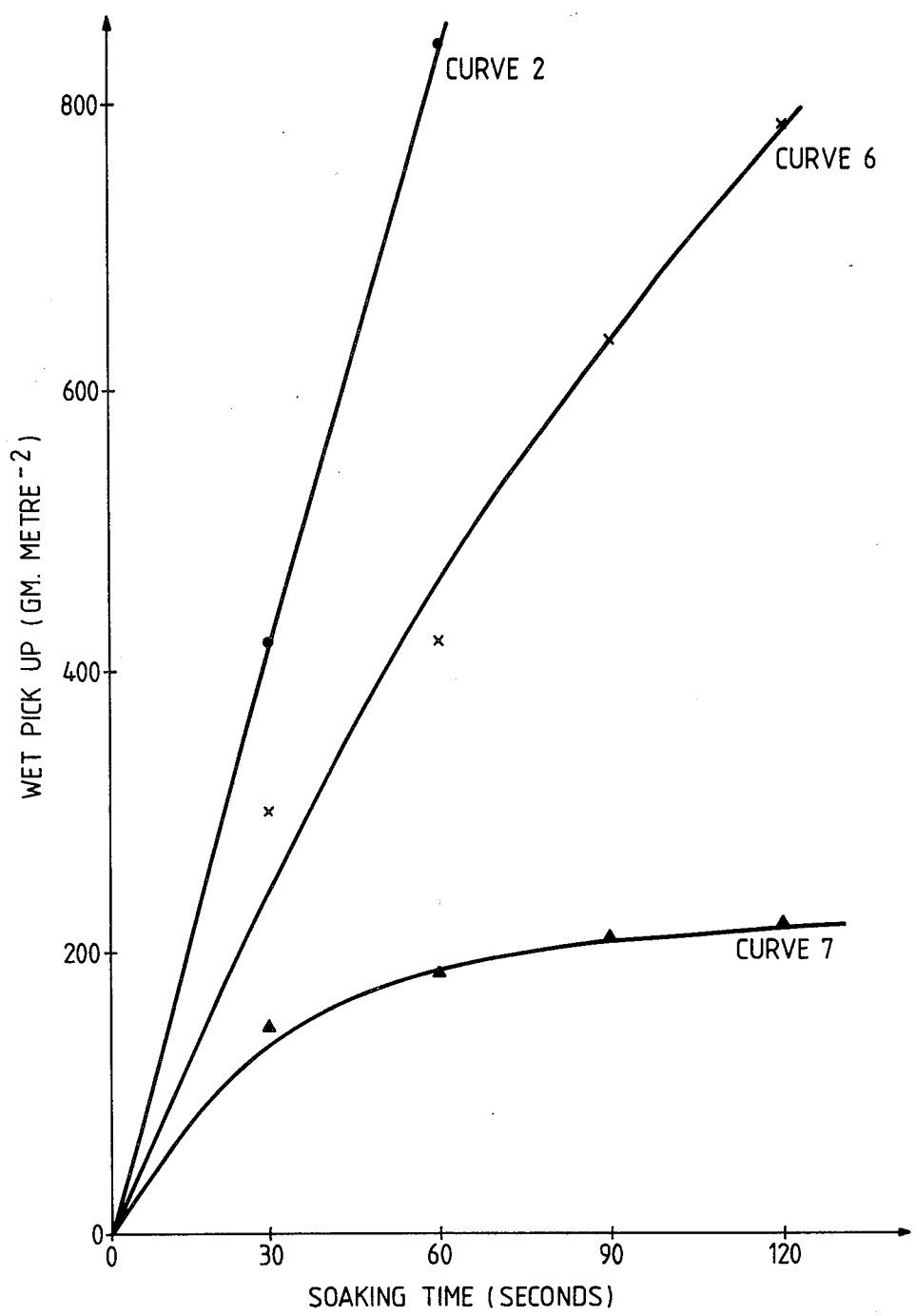
GRAPH.2. Fig.2.

ADHESIVES FOR PREPASTED WALLCOVERINGS

This invention relates to prepasted wallcoverings, by which we mean any sheet substrate, generally of paper but optionally of other materials such as hessian, provided with a dry but water-wettable adhesive coating by which it can be bonded to a wall or other suitable surface.

Various materials are used and others have been proposed as adhesives for wallpaper, either as aqueous adhesives that can be applied when required or as water-wettable prepaste adhesives. Some adhesives have been proposed as being suitable for either method of use, for instance in our European Patent Publication No. 8213. Others have been proposed only for use as water-wettable prepaste adhesives.

Traditional methods for making prepasted wallcoverings include the starch dusting process and the alkali-activated emulsion process. More recently British Patent Specification No. 1207387 has described applying aqueous compositions of polymeric binding agent and amylaceous adhesive and British Patent Application No. 2054628 has described forming the prepaste coating from a water-in-oil emulsion of a very high molecular weight water soluble synthetic polymer.

The traditional techniques have various disadvantages including high coating weights, cockling of the paper and the need for two applications. Methods in which the prepaste coating can be formed by a single application of polymer dispersed in an organic liquid, for instance as in European Patent Publication No. 8213 and British Patent Application No. 2054628, avoid some of these disadvantages. However the water absorption of such coatings tends to be very high with the result that the paper hanger has to exercise care during the re-wetting even though the process was intended to be a very simple process to operate. Thus if the user does not exercise care the coating is liable to pick up too much water too quickly. This may cause weakness in adhesion and, in particular, the coating may pick up so much water that the adhesive dissolves partially or completely into the re-wetting water and is thus lost from the coating.

In European Patent Publication No. 8213 (U.S. Pat. No. 4,361,462) the polymeric constituent of the adhesive is said to be a particulate water insoluble but water swellable synthetic polymer having a dry particle size of less than 10 microns, optionally combined with a water soluble polymer. It is stated that if the swellable polymer is ionic then the soluble polymer should have the same charge or be non-ionic and that the soluble and insoluble polymers are generally formed of the same monomer.

We have now surprisingly found that it is possible to form valuable compositions of water insoluble but water swellable particulate anionic polymeric material and water insoluble but water swellable particulate cationic polymeric material and that the resultant composition has valuable properties, especially when it is to be used as a water wettable adhesive for a prepasted wallcovering.

The composition may initially be formed as a dry powdered composition but generally is initially formed as a dispersion of the two types of polymeric material in a volatile organic liquid carrier. The composition eventually preferably takes the form of a prepasted wallcovering comprising a sheet substrate having a water-wettable adhesive coating comprising the two types of particulate polymeric materials.

We find that by using a blend of cationic polymer and anionic polymer the water absorption properties are improved in that the total amount of water absorbed may be reduced and the rate of absorption may be reduced. Also the coating is more stable to prolonged soaking. Thus there is much less tendency for the total amount of adhesive in the coating to be reduced significantly during prolonged soaking.

Each of the polymers is preferably formed of a polymerisable monomer or monomer mixture capable of providing high molecular weight water soluble polymers, and the polymer is rendered water insoluble but water swellable as a result of the inclusion of a cross-linking agent. The amount of cross-linker may be such that the polymer is highly swellable but is insoluble. Typically the concentration of cross-linking agent is from 20 to 2,000 ppm based on the weight of monomers. Suitable cross-lining agents are well known and include $N,N^1$-methylene bisacrylamide, ethylene glycol diacrylate or methacrylate, allyl acrylate and diallyl acrylate.

Suitable anionic polymers include those formed of acrylic acid of its water-soluble salts, methacrylic acid or its water-soluble salts or other anionic monoethylenically unsaturated monomers.

Suitable cationic polymers include those formed of aminoalkyl derivatives of acrylamide, methacrylamide, acrylic acid or methacrylic acid. These derivatives are preferably quaternised. Generally quaternisation or other derivative-formation steps are conducted on the monomer, before polymerisation, but if desired they may be conducted on the polymer itself.

Each polymer may be a homopolymer or may be a copolymer having the desired ionic properties. For instance it may be a copolymer of a cationic (or anionic) monomer with a non-ionic monomer such as acrylamide or methacrylamide. Generally the anionic polymer is a homopolymer but it is often preferred for the cationic polymer to be a copolymer, often with from 20 to 70% and most preferably around 50% by weight of non-ionic monomer such as acrylamide.

The water absorption characteristics of the prepaste coatings can be varied by varying the polymers and, in particular, by varying the proportions of the polymers. Useful results can be obtained with widely varying proportions of the two polymers, including for instance equal amounts by weight of the two polymers. However best results are achieved when one polymer is present in at least 1.5 times the amount of the other polymer.

It is generally preferred that the anionic polymer is present in a larger amount than the cationic polymer and the preferred class of compositions are those containing from 95 to 60% by weight anionic swellable but insoluble polymer (based on the weight of the cationic and anionic polymers), so that it includes 5 to 40% of the cationic swellable but insoluble polymer. Best results are generally obtained when the blend contains at least 15% of the cationic polymer, generally 15 to 30% cationic and 70 to 85% anionic polymer.

Other preferred compositions are those containing 99 to 85% cationic swellable but insoluble polymer, thus including from 1 to 15% of the anionic swellable but insoluble polymer. Generally the blend contains at least 3%, typically 5 to 15%, of the anionic swellable but insoluble polymer.

Each of the polymers is preferably made by an inverse suspension or inverse emulsion polymerisation method, for instance as described in European Patent Publication No. 8213. Thus an emulsion or suspension of an aqueous solution of the desired monomer is formed in an organic liquid and polymerisation is then conducted to form a dispersion of water-swollen polymer particles dispersed in the organic liquid. The degree of polymerisation may be as in European No. 8213. If it is desired that the particles should be dry then the dispersion may be dehydrated, for instance by azeotropic distillation, so as to remove some or all of the water.

The dispersion of dry or swollen particles can be incorporated direct into the composition that is to be coated onto the paper or other substrate, for instance by being merely blended with a corresponding dispersion of the other polymer and optionally with further organic liquid carrier, provided the carrier used for the polymerisation is sufficiently volatile and otherwise suitable for the coating and evaporation stages. If it is not suitable then the polymer particles may be separated from the carrier and redispersed, either dry or while swollen, in a suitable carrier in known manner. It is preferred to form the two types of polymers separately as dispersions and then to blend the dispersions.

The particles in the mixed dispersion or other composition may be dry, that is to say not substantially swollen by water, in which event they will have a particle size generally below 10 microns and preferably from 0.2 to 6 microns, most usually about 1 to 4 microns. Often however the particles in the dispersion are swollen by water, for instance to at least 5 times and often at least 20 times their unswollen volume. Thus their diameter may treble in size. The total amount of water in each particle is generally not more than 100%, and preferably not more than 50%, by weight polymer plus water.

It is essential that liquid compositions of the invention should be substantially non-aqueous in order that the two forms of polymers do not interact with one another in the liquid dispersion. The dispersion may contain sufficient water to dissolve into the polymeric particles but the continuous phase of the dispersion should be substantially anhydrous since if it contains free water the particles will stick to one another and interact.

In order that a liquid dispersion can easily be coated onto the substrate, so as to form the prepaste coating, the carrier of the dispersion is preferably a volatile organic liquid, typically white spirit or kerosene or other low boiling hydrocarbon. The boiling point is generally below 100° C. and preferably below 70° C. The boiling point and volatility should be such that it is possible easily to remove the hydrocarbon after coating without having to apply uneconomic amounts of heat energy, and preferably evaporation occurs substantially without application of heat. Although the composition can initially be formulated at any desired solid content it is preferred that the composition contains from 60 to 85%, most preferably 70 to 80%, by weight solids based on the weight of solids and organic carrier.

The composition may include additional materials to facilitate formation or use of the composition or to improve the properties of the resultant coating. For instance the composition may include a film forming polymeric material to adjust the adhesion properties of the adhesive coating or it may include a viscosity modifier either to adjust the properties of the composition during application to the substrate or to adjust the properties of the adhesion coating. Various soluble polymers may be used for this purpose. They may be included in the composition in particulate form.

A prepasted wallcovering may be made by forming a water-wettable adhesive coating on a sheet substrate by applying to the substrate the described dispersion containing cationic particles and anionic particles.

The coating may be an overall coating or may be applied in a pattern or other discontinuous coating. Each of the polymers in the coating will generally remain in separate particulate form in the coating, since the particles do not merge to form a continuous film. Each particle is generally substantially dry and generally has a maximum dimension below 10 microns. The coating weight is typically 2 to 8 $g/m^2$ dry weight.

The resultant prepasted substrate may be used in conventional manner, the coating being wetted with water when it is required to bond the substrate to a wall or other surface. Wetting of the composition results in the coating taking up water and the particles swelling and forming an adhesive coating. There may be some bridging or coalescing between the particles and there may be some chemical interaction but surprisingly it has been found that this is not deleterious. As mentioned, the coating has improved reduced water adsorption and rate of adsorption and is more stable to prolonged soaking than conventional prepaste coatings.

A further advantage of the described compositions is their relative ease of application to the paper or other substrate. For instance they can be applied by conventional printing equipment such as flexographic, gravure or rotary screen printing. Web inverters may be used to allow a continuous process i.e. printing followed by pasting to be carried out in a single operation. All such methods are convenient for wallpaper manufacturers to operate and have the advantage of giving good control and uniform coating weights. These represent considerable advantages over conventional methods such as the starch dusting method.

Another advantage of the compositions and coverings of the invention is that the prepasted coating can be subjected to hot embossing without any adverse effects on its re-moistening properties, this again representing a considerable advantage over starch based adhesive.

The following are some examples. Examples 1 and 2 are comparative, being of, respectively, anionic and cationic polymers and their use while Examples 3 to 7 are examples of the invention. Particularly preferred compositions are those of Examples 4 and 7.

In each example the composition is prepared and is applied onto a suitable wallcovering substrate at 5 $g/m^2$ dry solids. The water adsorption characteristic upon immersion in water is recorded in the accompanying graphs each of which show the wet pick-up as a function of the duration of soaking. Graph 1 shows the results for compositions having only anionic polymer content and graph 2 shows the results for compositions having only cationic polymer content. Each curve is numbered with the number of the corresponding example. Thus curves 1 and 2 are comparative.

EXAMPLE 1

A cross-linked sodium polyacrylate is prepared by the inverse emulsion process as described in the Examples of our European Patent Publication No. 8213 with a solids content of 70% and dispersed in a volatile carrier. It is coated onto a wallcovering substrate at 5 $g/m^2$ dry solids. The water absorption characteristics on immersion in water are shown in graph 1 as curve 1.

EXAMPLE 2

A cross-linked cationic polymer prepared from a 50:50 by weight mixture of acrylamide and quaternised diethylamine ethylacrylate by the inverse emulsion process as described in the Examples of our European Patent Publication No. 8213 with solids content 70% and dispersed in a volatile carrier. It is coated onto a wallcovering substance at 5 g/m² dry solids. The water absorption characteristics on immersion in water are shown as curve 2.

EXAMPLE 3

A blend is formed of the anionic polymer of Example 1 and the cationic polymer of Example 2 in the proportions 90:10 by weight and is coated. The water absorption characteristics are shown in graph 1 as curve 3.

EXAMPLE 4

An 80:20 blend of the anionic and cationic polymers of Example 3 is made and coated and gives the curve 4.

EXAMPLE 5

A 75:25 blend of the polymers of Example 3 gives curve 5.

EXAMPLE 6

A composition comprising 98 parts of the cationic used in Example 2 and 2 parts of the anionic swellable polymer described in Example 1 is formed and coated. It produces water absorption characteristics shown by curve 6.

EXAMPLE 7

A composition comprising 90 parts of the swellable cationic described in Example 2 and 10 parts of the anionic polymer described in Example 1 is formed and coated. It gives the curve 7.

In addition to the reduced water absorption rate demonstrated by the attached curves the exemplified blends also have the advantage that they give an adhesive layer which is more stable during and after remoistening.

We claim:

1. A substantially non-aqueous composition comprising a blend of water insoluble but water swellable particles comprising anionic polymer formed from monomers selected from anionic monomers and blends of anionic monomers with nonionic monomers, and water soluble but water swellable particles comprising cationic polymer formed from monomers selected from cationic monomers and blends with nonionic monomers; wherein the anionic monomers are selected from acrylic acid, methacrylic acid and water soluble salts thereof, and the cationic monomers are selected from aminoalkyl acrylamides, aminoalkyl methacrylamides, aminoalkyl acrylates, aminoalkyl methacrylates and quaternized derivatives thereof; and wherein the nonionic monomers are selected from acrylamide and methacrylamide.

2. A composition according to claim 1 in which the blend contains 60 to 95% by weight of the anionic polymer particles based on the total weight of the blend.

3. A composition according to claim 1 in which the blend contains 70 to 85% by weight of the anionic polymer particles based on the total weight of the blend.

4. A composition according to claim 1 in which the blend contains 99 to 85% by weight of the cationic polymer particles based on the weight of the blend.

5. A composition according to claim 1 in which the cationic polymer is a copolymer of cationic monomer with 20 to 70% by weight acrylamide or methacrylamide.

6. A composition according to claim 1 in which the anionic polymer and the cationic polymer are both cross-linked.

7. A composition according to claim 1 in which the particles are substantially dry and have a size of 0.2 to 10 μm.

8. A composition according to claim 1 in which the particles are swollen in water and have a dry particle size of 0.2 to 10 μm.

9. A composition according to claim 1 which also includes a water soluble polymer.

10. A composition according to claim 1 and that is in the form of a dispersion of the particles in a volatile organic liquid.

11. A composition according to claim 1 which is in the form of a prepasted wallcovering comprising a sheet substrate having a water wettable adhesive coating comprising the particles.

12. A prepasted wallcovering comprising a sheet substrate having a water wettable adhesive coating comprising a blend of water insoluble but water swellable particles comprising anionic polymer formed from monomers selected from anionic monomers and blends of anionic monomers with nonionic monomers, and water insoluble but water swellable particles comprising cationic polymer formed from monomers selected from cationic monomers and blends with nonionic monomers; wherein the anionic monomers are selected from acrylic acid methacrylic acid and water soluble salts thereof, and the cationic monomers are selected from aminoalkyl acryamides, aminoalkyl methacrylamides, aminoalkyl acrylates, aminoalkyl methacrylates and quaternized derivatives thereof; and wherein the nonionic monomers are selected from acrylamide and methacrylamide.

13. A wallcovering according to claim 12 in which the blend contains 60 to 95% by weight of the anionic polymer particles based on the total weight of the blend.

14. A wallcovering according to claim 12 in which the blend contain 70 to 85% by weight of the anionic polymer particles based on the total weight of the blend.

15. A wallcovering according to claim 12 in which the blend contains 99 to 85% by weight of the cationic polymer particles based on the weight of the blend.

16. A wallcovering according to claim 12 in which the cationic polymer is a copolymer of cationic monomer with 20 to 70% by weight acrylamide or methacrylamide.

17. A wallcovering according to claim 12 in which the anionic polymer and the cationic polymer are both cross-linked.

18. A wallcovering according to claim 12 in which the particles are substantially dry and have a size of 0.2 to 10 μm.

* * * * *